United States Patent [19]

Morgan

[11] Patent Number: 4,867,818
[45] Date of Patent: Sep. 19, 1989

[54] PROCESS FOR FABRICATING PRESSURE-SENSITIVE ADHESIVE MATERIALS

[76] Inventor: Burton D. Morgan, 325 Aurora St., Hudson, Ohio 44236

[21] Appl. No.: 247,637

[22] Filed: Sep. 22, 1988

[51] Int. Cl.[4] ............................................. B29C 47/06
[52] U.S. Cl. .................... 156/80; 156/244.11; 156/244.12; 156/244.13; 156/244.14
[58] Field of Search ............... 156/244.11, 244.13, 156/244.14, 244.12, 80

[56] References Cited

U.S. PATENT DOCUMENTS 4,379,806 4/1983 Korpman ............... 156/244.11
4,430,135 2/1984 Schmukler et al. ........... 156/244.11

FOREIGN PATENT DOCUMENTS 113283 7/1983 Japan ............................. 156/244.12
971558 9/1964 United Kingdom ........... 156/244.14

Primary Examiner—Caleb Weston
Attorney, Agent, or Firm—Oldham & Oldham

[57] ABSTRACT

A process for fabricating label feed stock laminates that comprise label face-paper substrate sheets covered with a layer of pressure-sensitive adhesive film in which the adhesive film is protected by a sheet of release-paper until the label face-paper substrate is to be fastened to a desired surface. The process involves extruding a pressure-sensitive adhesive in the form of a vertical tubular film whose shape is maintained by air pressure; thereafter collapsing the tube into a flat film by passing it through the nip of draw rolls, and then combining the adhesive film with the face-paper and the release-paper to form the desired laminate by passing both of the latter two through the draw rolls simultaneously with the adhesive film.

6 Claims, 1 Drawing Sheet

PROCESS FOR FABRICATING PRESSURE-SENSITIVE ADHESIVE MATERIALS

TECHNICAL FIELD

This invention relates to a process for placing a layer of pressure sensitive adhesive on substrate sheeting to form a laminate useful as label stock. More particularly, this invention relates to a process for contiguously preparing a flexible substrate structure with a layer of pressure sensitive adhesive on one side thereof, and in which the exposed surface of the adhesive layer is protected by release material. Specifically, this invention relates to a method of processing a pressure sensitive adhesive into tube-shaped blown film by extruding the adhesive composition through a revolving die, and thereafter, laminating the film with face-paper on one side thereof, and release-paper on the other side thereof, by passing the components of the laminate through nip rolls used in conjunction with an extruder apparatus to form the desired label stock.

BACKGROUND OF THE INVENTION

Since the advent of pressure-sensitive adhesives, such materials have been used in a variety of applications requiring the attachment of a relatively thin, flexible layer of material to an underlying surface. Pressure-sensitive adhesives, for example, have been extensively used to attach labels, stickers, decorative strips, tapes and the like, and are even being considered for use with postage stamps, all of the preceding and similar articles being sometimes referred to herein as "labels."

In the industrial area, pressure-sensitive adhesives find application, for example, in the attachment of decorative automotive striping, the attachment of decorative designs, informational text, and in many other areas too numerous to mention. Typically, such applications involve covering one surface of the material to be attached with the layer of pressure-sensitive adhesive, and then covering the exposed adhesive with a removeable release-material, usually paper, which is discarded prior to attachment of the material, or substrate, to the surface on which it is required.

In the past, the laminations described have commonly been prepared by dissolving the pressure-sensitive adhesive in a suitable solvent, and then coating the adhesive solution on the substrate whose subsequent attachment to a particular surface is required. The process of coating the adhesive solution on the substrate may be successfully accomplished by means of any of the standard coating techniques such as transfer coating, roll coating, or some such equivlanent method. However, while resort may be had to such techniques, they frequently have significant disadvantages with respect to the application of pressure-sensitive adhesives, particularly with respect to the substrates comtemplated by the invention. For instance, the use of solvents is often undesirable for the variety of reasons, including the fact that it frequently entails extensive and costly measures to assure compliance with environmental rules and regulations, including the recovery of the solvents employed. Not only do solvent recovery systems require very substantial investments in terms of Equipment, but the operation of the solvent recovery process is expensive in terms of energy consumption, as well as in the manpower required to operate the equipment. In addition, solvent recovery systems enevitably involve the loss of at least some of the solvent being recovered, creating additional expense.

Furthermore, particularly in the case of industrial applications, substantial thicknesses of adhesive coatings are required, making solvent depositions difficult, and sometimes impractical. A further disadvantage stems from the fact that coatings systems oftentimes result in coatings of varying thickness, making it difficult to carry out printing of the coated laminates which may be required subsequent to the coating operation. Still another disadvantage of coating processes is that they are relatively slow, limiting the amount of production that can be achieved through their use

DISCLOSURE OF THE INVENTION

In view of the preceding, therefore, it is a first aspect of this invention to provide an improved process for preparing flexible laminate structures which include layers of pressure-sensitive adhesives as a part thereof.

A second aspect of this invention is to provide a solventless process for fabricating substrate films, one of whose surfaces is covered with a pressure-sensitive adhesive.

An additional aspect of this invention is the provision of a process for fabricating substrates with a substantially thicker layer of pressure-senstive adhesive substantially thicker than coating systems presently in use for depositing such adhesives on substrate materials.

A further aspect of this invention is to furnish a process for continuously preparing laminate sheeting comprising a substrate one of whose surfaces is covered with pressure-sensitive adhesive fabricated from a blown adhesive film.

Another aspect of this invention is to provide a laminated sheet of relatively uniform thickness, comprising a substrate covered with a pressure-sensitive film protected by release-paper.

Yet another aspect of this invention is the provision of a method for fabricating a pressure-sensitive adhesive containing laminate more rapidly than is possible through the use of many conventional coating processes.

The foregoing and other aspect of this invention, as will be more fully described in the following detailed description of the invention are provided by a process for preparing a substrate with a pressure-sensitive adhesive thereon comprising:

extruding a pressure-sensitive adhesive through a die to form a vertical tube, and subsequently collapsing said tube by collapsing means to form a flat sheet of pressure-sensitive adhesive, wherein simultaneously with its collapse, said sheet of adhesive is laminated with a release-sheet, as well as a substrate-sheet, said release-sheet and said substrate-sheet being laminated to said sheet of adhesive on opposite sides thereof.

The foregoing and additional aspects of the invention are provided by a process of preparing a substrate with a pressure-sensitive adhesive thereon comprising extruding a pressure-sensitive adhesive through a circular, rotating die to form a vertical tube, maintained by air pressure;

subsequently collapsing said tube into a flat sheet by passing it through the nip of two adjacent draw rolls, rotating in opposite directions, and simultaneously with passing said adhesive sheet between said draw rolls, also passing a substrate-sheet and a release-sheet therethrough, said adhesive sheet lying between the other two sheets.

The foregoing and still further aspects of the invention are provided by pressure-sensitive labels made from a laminate prepared by the process of the penultimate paragraph.

The foregoing and yet other aspects of the invention are provided by a process for preparing a sheet of pressure-sensitive adhesive comprising extruding a chilled pressure-sensitive adhesive through a circular rotating die to form a vertical tube, maintained by air pressure, and subsequently collapsing said tube by collapsing means to form a flat sheet of said pressure-sensitive adhesive.

BRIEF DESCRIPTION OF THE DRAWINGS

The invention will be better understood when references had to the following drawings, in which like numbers refer to like-parts, and in which.

DETAILED DESCRIPTION AND BEST MODE FOR CARRYING OUT THE INVENTION

Figure 1:
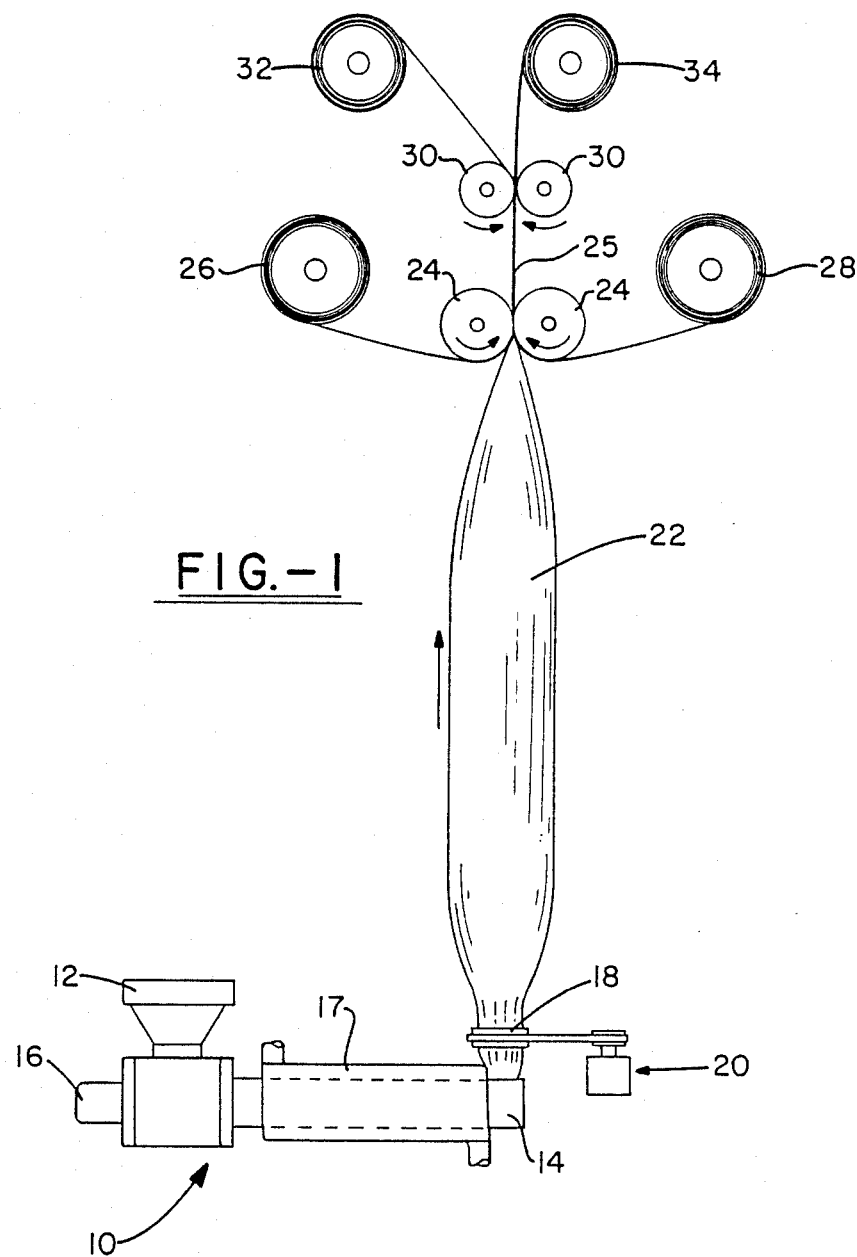
FIG. 1 is a semi-schematic representation of a pressure-sensitive adhesive label laminating line of the type comptemplated by the process of the invention.

FIG. 1 shows a semi-scematic representation of a pressure-sensitive adhesive label laminating line of the type comtemplated by the process of the invention. The laminating line comprises an extruder generally 10, including a feed hopper 12, a barrel 14, and a screw drive assembly 16. The extruder feeds a rotating circular die 18, driven by a die drive assembly, generally 20. A cooling jacket 17 is shown surrounding the extruder barrel 14. A tubular film of pressure-sensitive adhesive 2 is extruded from the die 18 which is pulled through the nip of draw rolls 24 where the adhesive is formed into a flat sheet. Face-paper, the substrate, from roll 26 is also drawn through the draw rolls 24, as is the adhesive-protecting release-paper from roll 28, thereby forming a sheet of laminated label feedstock 25. The laminated sheet proceeds through embossing slitter rolls 30, where selvage is trimmed and from the sides of the laminate or feedstock sheet. The removed selvage may thereafter by wound on the selvage take-up roll 32, while the finished laminated feedstock sheet proceeds to feedstock sheet storage roll 34.

Dimensions of the components of the processing line are largely determined by factors such as the size of the laminate sheet being produced, as well as other descretionary matters; therefore, the dimensions may be selected from a broad range, based on considerations well known to the art. Commonly, however, the rotating die will be from about 6 inches to 14 inches in diameter, about b 10 inches being typical, while the draw rolls will often be from about 8 inches to 12 inches in diameter.

At the commencement of the procedure, the material extruded from the die is fed between the draw rolls 24, following which air is blown into the tube to the extent necessary to expand its diameter to substantially the width required for the laminate shape being produced. The introduction of the air may be accomplished by an air outlet located interior of the periphery of the die, or simply by the temporary introduction of an air supply probe into the tube. Once the proper amount of air has been introduced, it is seldom necessary to supplement it, since the air so introduced is trapped within the tube. The thickness of the film is adjusted by the diameter of the tube, the extrusion rate, as well as by the draw roll speed. Ordinarily, however, the diameter of the tube will be from about 3 feet to 6 feet, a diameter of about 5 feet being typical. The speeds of extruder and draw rolls, as well as the accessory components, including the face-paper and release-paper rolls, the storage roll, etc, are adjusted to provide a processing rate of from about 800 to 200 feet per minute, a rate of about 1,000 per minute being common.

The distance between the rotating die 18, and the draw rolls 24, provides the film with an opportunity to stabilize itself relative to film thickness, stresses, and the like before being appled to the substrate. The distance between the die and the draw rolls, therefore, will depend upon matters such as the temperature of the film, the composition of the extruded adhesive and similar matters. Ordinarily, however, the distance will be from about 10 feet to about 20 feet, with a distance of about 16 feet providing satisfactory results in most cases. As indicated, the thickness of the film will depend upon the interrelationship of the factors mentioned, and may be varied within whatever limits are required. Usually conditions will be selected to provide a film of from about 1.6 to 1 micron in thickness.

Any of various pressure-sensitive adhesive compositions may be employed in the process of the invention, including the types well known in the adhesive arts. For example, adhesive compositions made from styrene-butadiene rubber, SBR, together with a resin may be employed, as may be a butyl rubber, preferably of relatively low molecular weight, e.g., less than 100,000, together with mineral oil; however, other equivalent compositions may be used as well.

While the temperature of the adhesive composition at the extruder die will depend upon the nature of the composition being extruded, it has been found desirably to extrude the pressure-sensitive adhesive at a temperature below about 10° C. so that the material will be sufficiently viscous to form a substantially cohesive tubular film. In this regard, it has been determined that most such compositions can be successfully formed into blown films at an extrusion temperature of from about −40° C. to 10° C. In addition to controlling the temperature of extrusion, it has been found desirable to rotate the die during the extrusion process in order to avoid positional variations in film thickness along the periphery of the extruded tube.

Figure 2:
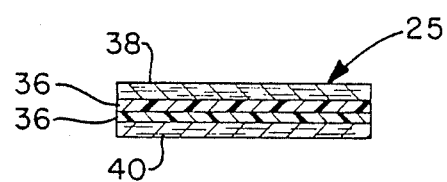
FIG. 2 is a cross-section of a pressure-sensitive label that can be fabricated by the process of the invention.

FIG. 2 shows a cross-section of a pressure-sensitive adhesive label feedstock 25 that can be fabricated by the process of the invention. As shown, the feedstock consists of a laminate comprising a double layer 36 of pressure-sensitive adhesive film, sandwiched between a layer of face-paper 38 and a layer of release-paper 40. The double layer shown is the natural result of the fact that collapse of the tubular film 22 causes the compression of one face of the film against the other, producing the double wall. Not only does the double-wall construction of the adhesive film result in the ability to make unusually thick films, particulary useful in industrial label applications, but the double layer structure tends to average out non-uniformities in the film resulting in the fabrication of a pariculary uniform layer of pressure-sensitive adhesive in the feedstock laminate, greatly facilitating printing thereon.

The face-paper useful for purposes of the invention may be selected from any of the types commonly used in label preparation, for example, 50 pound, coated litho paper; however, other papers or substrates may also be successfully used. The release-paper may also be selected from among a variety of papers commonly employed for such purposes, including, for instance, a 60 pound paper coated with silicone on one side.

Following fabrication of the finished laminated label feedstock sheet, the feedstock is normally processed further through printing, die stamping, and similar operations, in which finished label materials as previously described are produced.

While a best mode and preferred embodiment had been shown in the preceding, the scope of the invention is not meant to be limited thereby, but rather is to be judged by the scope and spirit of the following claims.

What is claimed is:

1. A process for preparing a substrate with a pressure-sensitive adhesive thereon comprising:
   extruding a pressure-sensitive adhesive through a die to form a vertical tube, and
   subsequently collapsing said tube by collapsing means to form a flat sheet of pressure-senstive adhesive, wherein simultaneously with its collapse, said sheet adhesive is laminated with a release-sheet, as well as a substrate-sheet, said release-sheet and said substrate-sheet being laminated to said sheet of adhesive on opposite sides thereof.

2. A process according to claim 1 wherein said tube is maintained by air pressure until collapse, and said collapsing means comprises cylindrical draw rolls, through whose nip said tube passes.

3. A process according to claim 1 wherein said die is a circular die which is rotated during the extrusion, and the pressure-sensitive adhesive is chilled prior to passing through the die.

4. A process of preparing a substrate with a pressure-sensitive adhesive thereon comprising:
   extruding a pressure-sensitive adhesive through a circular, rotating die to form a vertical tube, maintained by air pressure;
   subsequently collapsing said tube by passing it through the nip of two adjacent draw rolls, rotating in opposite directions, and
   simultaneously with passing said adhesive sheet between said draw rolls, also passing a substrate-sheet and a release-sheet therethrough, said adhesive sheet lying between said sheets.

5. A process according to claim 4 wherein said pressure-sensitive adhesive is chilled below about 10° C. prior to passing through the die.

6. A process for preparing a sheet of pressure-sensitive adhesive comprising
   extruding a chilled pressure-sensitive adhesive through a circular rotating die to form a vertical tube, maintained by air pressure, and
   subsequently collapsing said tube by collapsing means to form a flat sheet of said pressure-sensitive adhesive.

* * * * *